US007773866B2

(12) United States Patent
Goeckner

(10) Patent No.: US 7,773,866 B2
(45) Date of Patent: Aug. 10, 2010

(54) SYSTEM AND METHOD FOR PREVENTING TANK OVERHEATING

(75) Inventor: Victor D. Goeckner, Auburn, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 315 days.

(21) Appl. No.: 11/718,626

(22) PCT Filed: Nov. 8, 2005

(86) PCT No.: PCT/US2005/040434

§ 371 (c)(1),
(2), (4) Date: Jun. 8, 2007

(87) PCT Pub. No.: WO2006/052969

PCT Pub. Date: May 18, 2006

(65) Prior Publication Data

US 2008/0011865 A1    Jan. 17, 2008

Related U.S. Application Data

(60) Provisional application No. 60/626,650, filed on Nov. 10, 2004.

(51) Int. Cl.
*A47J 27/00*    (2006.01)

(52) U.S. Cl. .................. 392/442; 392/445; 392/461

(58) Field of Classification Search .................. None
See application file for complete search history.

(56) References Cited

U.S. PATENT DOCUMENTS

| 3,443,508 | A | * | 5/1969 | Reynolds et al. | 99/282 |
|---|---|---|---|---|---|
| 5,285,717 | A | * | 2/1994 | Knepler | 99/282 |
| 5,375,508 | A | * | 12/1994 | Knepler et al. | 99/280 |
| 5,647,055 | A | | 7/1997 | Knepler | |
| 6,439,105 | B1 | * | 8/2002 | Ford | 99/280 |
| 7,163,126 | B2 | * | 1/2007 | Knepler | 222/52 |
| 7,228,066 | B2 | * | 6/2007 | Pope | 392/441 |
| 7,503,253 | B2 | * | 3/2009 | Rahn | 99/280 |
| 7,503,287 | B2 | * | 3/2009 | Friedrich | 122/14.22 |

OTHER PUBLICATIONS

International Search Report issued in application No. PCT/US05/040434 (2007).

* cited by examiner

*Primary Examiner*—Thor S Campbell
(74) *Attorney, Agent, or Firm*—Barnes & Thornburg LLP

(57) ABSTRACT

A system, apparatus and method for preventing a water tank from overheating. The apparatus includes a water delivery system for delivering water to a reservoir for receiving water. The reservoir includes a level sensor and an associated heater for heating water in the reservoir. The system includes a water dispensing system for dispensing heater water from the reservoir. A controller is provided to control the operation of the system.

15 Claims, 3 Drawing Sheets

SYSTEM AND METHOD FOR PREVENTING TANK OVERHEATING

CROSS-REFERENCE TO RELATED PATENT APPLICATION

This patent application is a U.S. Nationalization of international patent application no. PCT/US2005/040434, filed Nov. 8, 2005, which claims the benefit of U.S. Provisional Patent Application No. 60/626,650, filed Nov. 10, 2004. The disclosure set forth in the referenced provisional application is incorporated herein by reference in its entirety, including all information as originally submitted to the United States Patent and Trademark Office.

BACKGROUND

The present disclosure relates to a system and method for preventing a water tank from overheating. The water tank might be the type which is used in a water heating system as well as a brewer. The disclosure is not intended to be limited to these areas but, is considered to be applicable to a variety of water heating devices which will benefit from the teachings of this disclosure.

Many forms of brewing apparatus have been developed which use a device for heating water. In some of the apparatus, the water heating device is in the form of a tank or reservoir which includes a heating element or device either inside the tank or external to the tank for heating water in the tank. Water is introduced into the tank for heating and dispensing over a beverage brewing substance. Alternatively, water is dispensed into the tank for heating and retained in the tank for subsequent dispensing.

A concern in such a water heating system is to prevent the water from overheating. Generally, depending on altitude, water will boil at a temperature of approximately 212° F. If the water is too hot, it will tend to boil and vaporize. In a situation where heated water is used to brew a beverage it may be undesirable to boil the water because the brewing temperature may be too high and the boiling action will reduce the quantity of water which is available for brewing. In other words, if the user of such a brewing apparatus does not want to use boiling water to brew a beverage, but rather a water temperature which is below boiling, such as 190-205° F.

Some prior art devices control the temperature of the heated water by use of a bimetallic thermostat. Such thermostatic devices are known in the art and available to one of ordinary skill in the art for this purpose. By way of example, and not limitation, the bi-metallic thermostat opens when the temperature drops below a pre-determined lower range thereby signaling to a controller that the corresponding heating element should be energized to heat the water in the tank. When the upper level temperature is detected, the bi-metallic thermostatic sensor closes, closing the circuit to the heating element and shutting off the heating element. By opening and closing the bi-metallic circuit, the heating element is turned on and off to controllably add energy to the water.

In some environments, it may be desirable to include a backup system for detecting the tank heating and preventing overheating in the event of the failure of the first thermostatic sensor. For example, Underwriters Laboratory, UL, may require backup thermostatic sensors in some situations. In order to satisfy the UL certification requirements, such a backup sensor or system may need to be provided.

Additional features and embodiments will become apparent to those skilled in the art upon consideration of the following detailed description of drawings.

BRIEF DESCRIPTION OF THE DRAWINGS

The present disclosure will be described hereafter with reference to the attached drawings which are given as a non-limiting example only, in which: The detailed description particularly refers to the accompanying figures in which.

DETAILED DESCRIPTION

Figure 1:
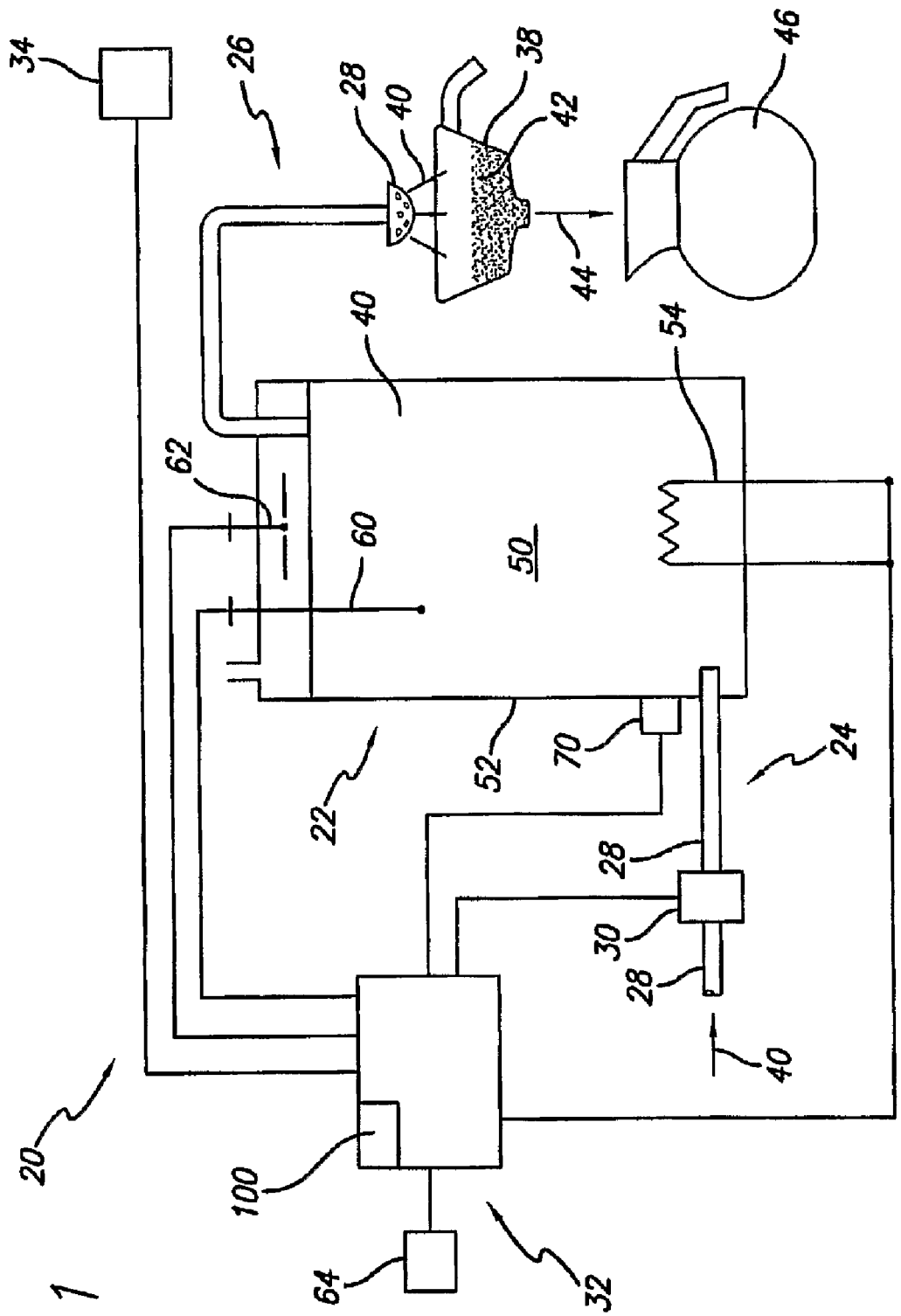
FIG. 1 is a diagrammatic illustration of a system which embodies the system and method for preventing tank overheating as disclosed.

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description and illustrated in the drawings.

While the term "heated" may be used throughout this disclosure, the term is to be broadly interpreted to include all forms of water or dilution liquid of any temperature, generally in which the water has been heated. The term heated includes the term "hot" such that one might consider the water to be hot based on the numerical temperature. Generally, the temperature of the water is below or at the relevant boiling temperature (212 degrees F. at sea level) above which the water will generally transform to steam. The term heated is used to distinguish from the term unheated such that unheated water is generally introduced into the reservoir during the brewing cycle. In or near the reservoir the water is heated resulting in heated water.

The present disclosure may be used in connection with a variety of beverage making machines. Terms including beverage, brewed, brewing, and brewed beverage as may be used herein are intended to be broadly defined as including, but not limited to the brewing or making of tea, coffee and any other beverages or food substances that will benefit from the present disclosure. This broad interpretation is also intended to include, but not be limited to, any process of dispensing, infusing, steeping, reconstituting, diluting, dissolving, saturating or passing a liquid through or otherwise mixing or combining a beverage substance with a liquid such as water without limitation to the temperature of such liquid unless specified. This broad interpretation is also intended to include, but is not limited to beverage substances such as ground coffee, tea, liquid beverage concentrate, powdered beverage concentrate, flaked, granular, freeze-dried or other forms of materials including liquid, gel, crystal or other form of beverage or food materials to obtain a desired beverage or food product. This broad interpretation is intended to include, without limitation, at least funnel and filter-type, packet or pouch-type, pod-type or other prepackaged or unpackaged forms of retaining and brewing a beverage or making of a food product. The terms heated water may be interpreted as hot water, and generally refers to adding energy to water to heat the water above ambient temperature.

While the disclosure shows an illustration of a brewer as described, it is intended and understood that the term brewer is to be broadly interpreted to include brewers of any configuration including that as shown as well as, by way of example but not limitation, drip, filtered, single cup or pod brewers. Pod brewers are brewers which retain a pod or prepackaged beverage product and deliver to or force water through the pod to brew a beverage. Many pod brewers produce one or two cups of beverage instead of 4-12 cups as is produced by many other brewers. Pod brewers may be configured consistent with the teachings of this disclosure to be connected to a pressurized water line and provide line pressure brewing. The teachings of this disclosure are intended to be broadly interpreted and applied to a variety of brewer sizes, styles and configurations consistent with the principals disclosed herein.

Figure 2:
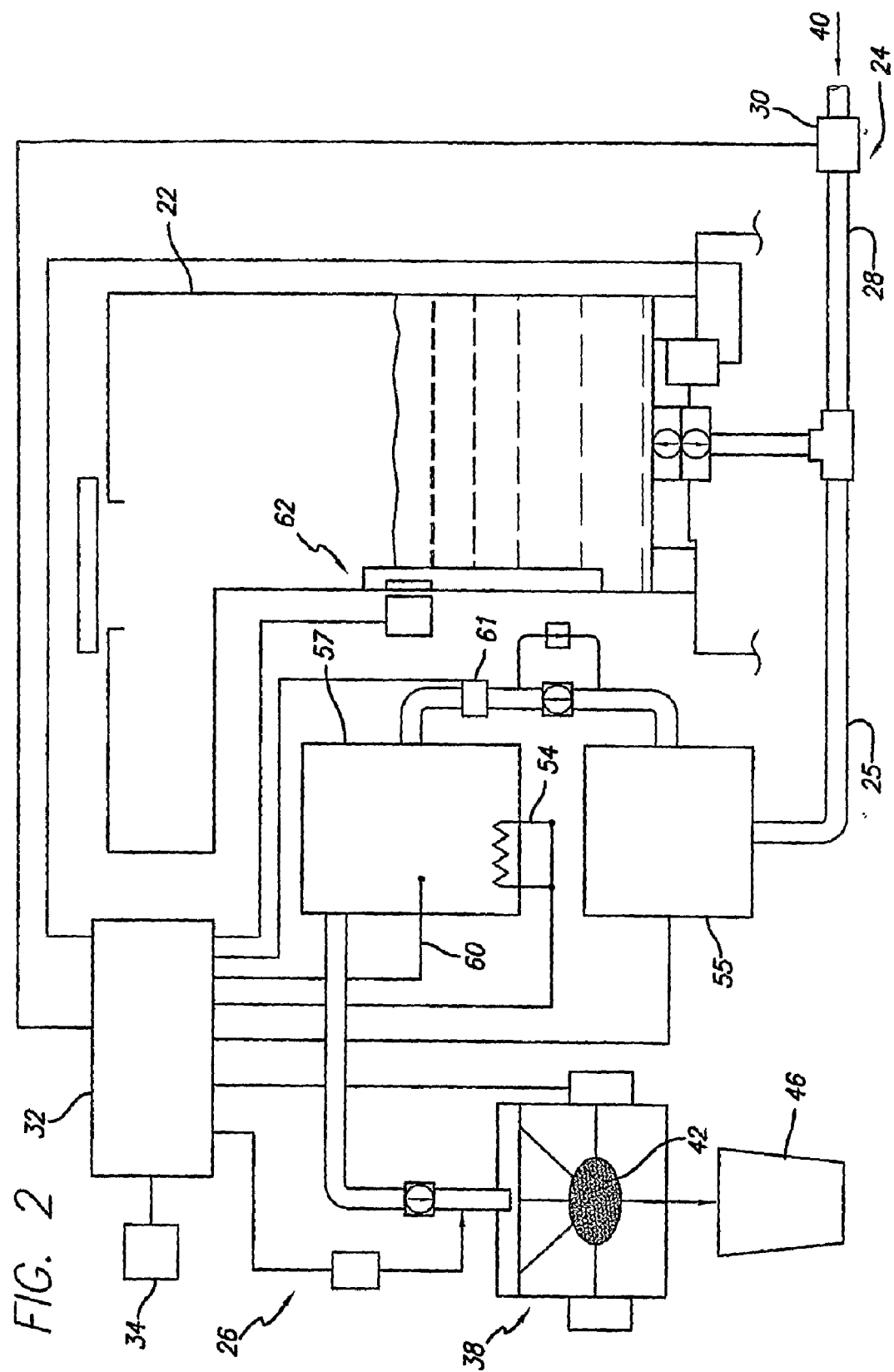
FIG. 2 is another embodiment of the disclosed system, method and apparatus.

Turning now the diagrammatic illustration of FIGS. 1 and 2, the system 20 includes a water heating tank or reservoir 22 which includes a water delivery system 24. While there are differences in FIGS. 1 and 2 the same or similar structures are identified by the same reference number. The description of FIG. 1 will be introduced first followed by the description of FIG. 2.

Water 40 is controllably dispensed into the tank 22 by the water delivery system 24 and exits the tank 22 through a water dispensing system 26. The water delivery system 24 of the illustrated embodiment includes a pressurized inlet water line 28 and a controllable valve 30. A controller is provided and is connected to and communicates with the controllable valve 30. A switch or other activation device 34 is coupled to the controller 32 to controllably operate the dispensing of water through the dispensing line 26. In this regard, when a dispensing cycle is activated at the dispensing switch 34 the controller 32 controllably operates the controllable valve 30 to allow water 40 to flow through the pressurized line 28 into the reservoir 22. Increased flow of water into the reservoir 22 results in displacement of water from the reservoir and movement of water out through the dispensing system 26.

The water delivery system 24 is illustrated and shown as a pressurized water inlet line 28 and a controllable valve 30. However, it should be noted that a gravity feed tank such as is shown in pour-over brewing devices are well known in the art can also provide a water delivery system 24. In this regard, water will be dispensed into a corresponding basin for gravity feed to the reservoir 22. It is envisioned that the pressurized water line and the gravity feed system described herein are fully incorporated herein in this specification should be broadly interpreted as such.

In the broad, general diagrammatic illustration as provided, the system 20 is employed with a brewing device such that the dispense line 26 includes a spray head 28 for dispensing water to a brewing holder 38, for example but not limited to a funnel or holder drawer 38 positioned there below. The funnel or drawer embodiment may be used with loose brewing substance or pre-packaged volumes of brewing substance. The holder drawer may be used with pre-packaged volumes of brewing substance, for example coffee pods or other appropriate configurations which allow a user to control the type and volume of brewing substance used in the brewer.

Water 40 is dispensed onto a brewing substance 42 in the holder 38 for producing a brewed beverage 44 to be dispensed into a container 46 such as a carafe or cup. It is envisioned that the present system and method can be employed not only with a brewing device as illustrated but also a water dispensing device which dispenses heated water. Additionally, there are other embodiments which will benefit from the teachings of the present disclosure, and as such, these embodiments are intended to be included within the scope of this disclosure. Reference to the system and method of the present disclosure is to be broadly interpreted.

With regard to FIG. 2, the method and system is incorporated with an apparatus referred to as a single cup or pod brewing machine. The details of this pod brewing machine are provided in a corresponding pending application, U.S. Patent Application Ser. No. 60/564,012 filed Apr. 21, 2004, titled Pod Brewer Dry Plug Prevention System, assigned to the assignee of the present application and identified as, and corresponding U.S. patent application Ser. No. 11/111,598 filed Apr. 21, 2005 and PCT Application No. US2005/013591 filed Apr. 21, 2005, the subject matter of which is incorporated herein in its entirety by reference.

In summary, the system employs a water tank or reservoir 22 which provides water through an inlet line 25 to ultimately provide water to a dispensing line 26. Intermediate to the inlet line from the reservoir 22 and the dispense line 26 is a heater 54 which is pumped by pump 55. The pump 55 may be any form of pump including peristaltic, piston, gear or any other pumping device that may be used to transfer water from the reservoir 22 to the heating chamber 57 for heating by the heating element 54. The pump 55, heating chamber 57, heating element 54 are connected to the controller 32. While there are distinctions between the general device shown in FIG. 1 and the more specific device shown in FIG. 2, both systems incorporate the methods of operation as taught herein. Both systems still take the transfer, heating and dispensing of water to a holder 38 for infusing a brewing substance 42. Both systems are concerned with preventing damage to the heating element and system.

Level sensor as shown in FIG. 2 is associated with the reservoir 62 in the form of a read switch. One difference between the system as shown in FIG. 1 and FIG. 2 is that while the system in FIG. 1 operates primarily based on a time dependent basis, the device as shown in FIG. 2 is configured to operate on a flow count basis. In this regard, a flow counter or flow meter 61 is provided to detect the flow of water from the pump 55 to the heating chamber 57. The end of a predetermined number of flow counts, the controller 32 terminates operation of the pump 55.

As shown in FIG. 1, the reservoir 22 containing water 40 within a cavity 50 defined by the wall 52 is heated by a heating element 54. The heating element 54 is coupled or otherwise communicates with the controller 32 so that the controller 32 can controllably operate the heating element 54. Many various forms of heating element 54 are fully within the scope of the present disclosure and are considered to be broadly interpreted and included herein. While a resistive type of heating element 54 is shown in the present diagrammatic illustration of FIG. 1, it is envisioned that various other forms of heating elements such as external blanket heating elements which contact or otherwise are positioned proximate to the wall 52 are within the scope of the present disclosure. Additionally, other forms of providing energy including mechanical, vibrational, microwave or other sources such as passive heating elements are considered to be included within the scope of the present disclosure.

Additionally, it should be noted that a variety of forms of heating devices and reservoirs 22 are considered herein. For example, there are devices which have been developed which include reservoirs or tanks to retain and heat a transient portion of water for use in a brewing process. For example, in U.S. patent application Ser. No. 60/564,012, filed Apr. 21, 2004, titled Dry Plug Prevention System and assigned to the assignee of the present invention, considers a device which includes a heated water tank which may contain a smaller quantity of water than as disclosed in FIG. 1. U.S. application Ser. No. 11/111,598 is fully incorporated herein by reference without limitation. Additionally, there are devices which use flash heaters or other heating devices which may be used in brewing devices and will benefit from the teachings of this disclosure. The system also includes a temperature probe, temperature sensor, or thermostat 60 which coupled or otherwise communicates with the controller 32. The thermostat or probe 60 detects the temperature of the water in the tank at a desired position so as to provide a representative temperature of the water volume. It should be noted that the thermostatic device may be placed in the tank, external, but contacting the tank as well as external and not contacting the tank. Additionally, the thermostat may also be embodied in a variety of forms such as electrical thermal couples, electro-mechanical bi-metallic switches, or any other form of temperature sensing which may be employed on a regular basis for sensing the temperature of water in the reservoir 22. The reference to a temperature sensor, thermostat or probe is to be broadly interpreted to include any known or hereafter known devices or systems for sensing the temperature of water retained in the reservoir 22.

In the embodiment as shown in FIG. 1, a level sensor 62 is also included and coupled to the controller 32. The level sensor 62 detects the level of water in the tank and provides information to the controller to controllably operate the controllable valve 30 to regulate the flow of water into the reservoir 22. The embodiment as illustrated in FIG. 1 may also include a low duty switch 64. The low duty switch is often referred to as a "vacation switch" such that it allows the system to be switched into an energy conserving mode when the user is away for an extended period of time, such as on a vacation. When the vacation switch is activated the system powers down the controller and other related mechanisms and reduces the monitoring temperature or holding temperature of the water. By reducing the hold temperature of the water, energy is conserved and the volume of water which might otherwise have a higher evaporation rate over an extended period of time will be reduced.

The vacation switch may be a physical switch or the function of the vacation switch feature may be incorporated in the invention by way of a non-physical software switch which activates after a predetermined period of time or upon the occurrence of some other measurable condition. the vacation switch may be a combination of both a physical switch and a software switch. In a software embodiment the on-off switch may be used to power down the various functions and features when the switch is in the "off" condition. When the switch is activated or turned "off" the system powers down the controller and other related mechanisms. The system may be completely turned off by disconnecting or unplugging the device from the power source.

The system may be reactivated, the switch is returned to the on condition, upon the occurrence of an event such as, but not limited to, a change in the water level, a pod is inserted into the machine or removed, power is returned to the machine, or a switch is operated. Upon switching the switch to the return mode, in which the system is operated using all of its functionality, the temperature of the water 40 retained in the reservoir is raised to a higher temperature for brewing in comparison to the vacation or off mode temperature. In other words, in the vacation mode the temperature of the water may be allowed to drop to 140°, whereas in the non-vacation mode, the holding temperature of the water may be at a desired brewing temperature such as a temperature or range within the range of 190-205° F. It should be noted that the temperature ranges provided above for any specific brewing temperature is not considered to be a limitation of the present disclosure but merely is provided for purposes of description and an example of a system in which the present system and method may be used. In the off mode the temperature of the water may drop to a lower temperature until the system is reactivated. the temperature in the off mode will generally drop no lower than the corresponding room temperature.

As an additional matter, a second temperature sensor 70 may be provided. As illustrated, the second temperature sensor 70 is an external thermostat. However, as noted above, any variety of temperature sensor 70 may be used in this device to provide this function including any of the broadly described types of temperature sensors as noted above.

By way of example, a brewing cycle is disclosed. When a user desires to initiate a brewing cycle, the user places a charge of brewing substance 42 in the holder 38 and positions it in an appropriate location below the spray head 28. Positioning of the holder 38 in this position is known in the art and any of various methods for positioning the brewing substance in a holder or other device or structure is fully included in the present disclosure. Once the user positions a container or server such as a carafe, thermal server or cup 46 below the holder 38, the user can activate the start switch or activation switch 34. The activation switch signals the controller to initiate a brewing cycle whereby the controller opens the controllable valve 30 to allow water 40 to flow through the inlet line 28 and into the reservoir 22. In the embodiment as shown in FIG. 2, the activation switch signals controller to initiate a brewing cycle whereby the system activates the water pump to transfer water from the reservoir. As water enters the reservoir the level of the water in the reservoir will be detected by the level sensor 62. At a predetermined level, the valve 30 may be operated to a closed position, to cease the flow of water into the reservoir 22. Generally simultaneous with the activation of the controllable valve 30, the controller 32 signals the heating element 54 to energize. By energizing the heating element 54 generally at the time the brew cycle is initiated, water entering the reservoir 22 will be heated. Generally, unheated water entering the lower portion of the reservoir 22 displaces heated water in the upper portion of the reservoir. At a predetermined level, a siphon is created through the dispense line 26 thereby promoting passage of a desired quantity of water through the dispense line 26. Generally, the operation of the brewing cycle or dispensing cycle is well known in the art. At the conclusion of the brewing cycle, generally the brewing cycle is determined by time, the control valve 30 is closed and the dispense line 26 drains until the siphon is broken. Upon breaking of the siphon, the dispense line will drain and the brewing cycle will have ceased.

Prior to the initiation of the next brewing cycle, the heating element 54 will add energy to the water 40 in the reservoir 22 to a predetermined temperature or range of temperatures as sensed by the temperature sensing device 60. Depending on the length of time between brewing cycles, the heating element 54 may cycle on and off one or more times.

When the user decides to activate the vacation switch 64, the system will power down as described above. In this powered-down mode, the temperature probe 60 may not function in the same manner and as such it might be desirable to have a second temperature sensor 70 to monitor the low level heating activity in the vacation mode. In this mode, it also would be desirable to prevent the drainage of water from the reservoir. However, even if water is drained from the reservoir, it would be desirable to provide a fail-safe mechanism to alert or shut down the system under controlled circumstances to prevent uncontrolled heating. It is desired to prevent uncontrolled heating since uncontrolled heating within the reservoir could result in damage to the reservoir, seals or connections to the reservoir as well as the heating element and other control devices associated with the reservoir, including the thermostat 60, level sensor 62, other surfaces or structures.

The present system and method overcomes these potential problems and provides a fail safe mechanism. In one embodiment, when the vacation switch 64 is operated to the "on position" (when the user desires to switch the system back to regular operating mode at the end of an extended period in which the system is not operated), the system initiates a method for preventing inadvertent overheating. In advertent overheating may occur as the result of low water in the tank which might result from a leak or evaporation from not being used for an extended period of time.

When the vacation switch or the on-off switch 64 is operated to the on position, the system controller is reactivated and controllably pulses power to the heating element 54. In this manner, the system 20 can cautiously provide controlled pulses of energy to heat to the tank without providing generally unlimited heating. This is important since a small pulse of heat will not cause damage, but can be used in a control system to determine if it is safe to proceed with regular heating. To do otherwise, for example, turn on the heater heating element 54 to the regular heating mode, could damage the tank as described above. For example, if the heater was turned on and provided with full energy to bring the temperature of the water in the reservoir 22 up to the desired brewing or regular holding temperature, absence of water in the tank could result in overheating and damage to the system. This is because the absence of water in the tank will result in heat flowing freely through the air or atmosphere in the tank causing a rapid temperature build-up in the tank. However, if water is present in the tank when the heater is initiated, the water will absorb the heat energy and dissipate the heat energy in a more controlled, manageable fashion.

Figure 3:
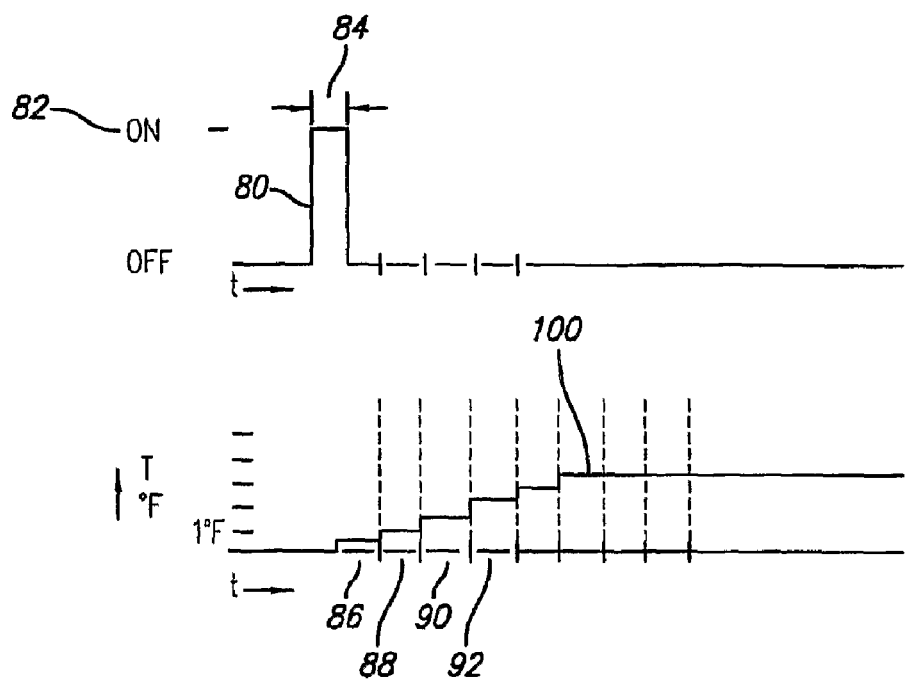
FIG. 3 is a general timing and temperature diagram showing an example of one result of using the present system and method showing an acceptable response to an initial pulse of heating energy.

With reference to FIG. 3, two related charts are shown. The upper chart shows a pulse 80 of energy associated with turning the heating element 54 on 82. The chart is related to time showing a pulse or energy interval of a predetermined period 84. While a specific period is not defined in the upper chart of FIG. 3, in the present example we will refer to this pulse as having a 5 second interval 84. The lower chart shows the temperature response to the pulse of energy in a system in which water is retained in the reservoir. The lower chart also tracks the change in temperature over time related to the pulse of energy 80 in the upper chart.

As shown in FIG. 3, an acceptable response is shown. In this acceptable response, the temperature change is monitored over several intervals 86, 88, 90, 92. Alternatively, the first temperature sensor or probe 60 may be used as well as both temperature sensors. This will help to assure a variety of modes can be used depending on the level of assurance required or desired. Shown in FIG. 3, the initial time period of four seconds, holds an increase of approximately 0.5° F. to 1° F. These time periods and temperature ranges are provided for purposes of describing the present system, method and apparatus for purposes of this example but are not intended as a limitation. The subsequent temperature changes are also of generally equal proportion. Such a response in the lower portion of FIG. 3 shows that some water is available in the reservoir and that continued heating likely will not damage the system.

With reference to FIG. 3, after 20-30 seconds, if there is water in the tank, the temperature tends to level out 100. The temperature shown in the lower portion of FIG. 3 levels out because the energy in the heating pulse has been absorbed and conducted into the water. When three consecutive intervals with less than 0.5° F., the system is programmed to assume that water is in the heating chamber or reservoir 22. During the initial 15-20 seconds after the pulse, the temperature versus time graphs for FIGS. 3 and 4 appear to be the same. However, FIG. 3, as noted above, tends to level out due to the presence of water.

The system 20 also may be configured to include a counter 100 coupled to or otherwise communicating with the controller 32. Once the system 20 pulses the heater 54 for a 5-second interval, the heater is turned off. The sensor 70 monitors changes over subsequent 4-second intervals. The counter may be incremented, decremented, or cleared in response to conditions which are sensed over the following time periods. The time periods may be few or many and we will refer to a three reading period method in the present description. The system is by no means limited to only a three interval sensing period and may include more or fewer periods.

At the end of the first 4-second interval, if the temperature as sensed has changed a predetermined amount, for example less than 0.5° F., the counter 100 increments one position. After the next 4-second interval, the same occurs and the next 4-second interval, the same events occur. Such a situation would result in the counter 100 sensing three changes within an acceptable temperature range or the absence of such changes to indicate a positive condition. These circumstances can be interpreted to indicate that there is water in the tank and that it is acceptable for the system to continue heating the water in the tank. The presence of water in the tank results in small increases in temperature due to the fact that water in the tank absorbs the heat energy and dissipates it throughout the water, resulting in small incremental changes.

Figure 4:
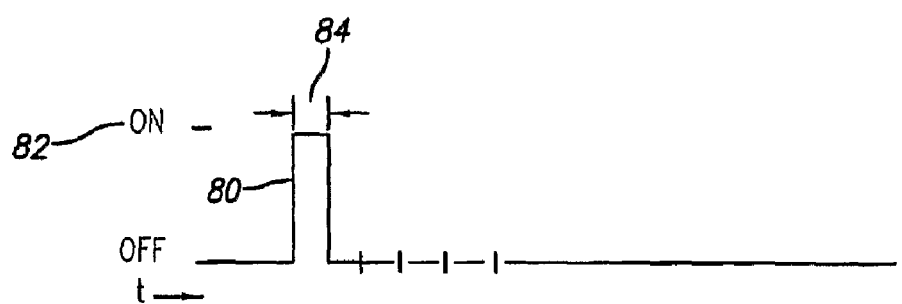
FIG. 4 is a general timing diagram showing an undesirable response to the application of a pulse of heating energy.
Figure 4:
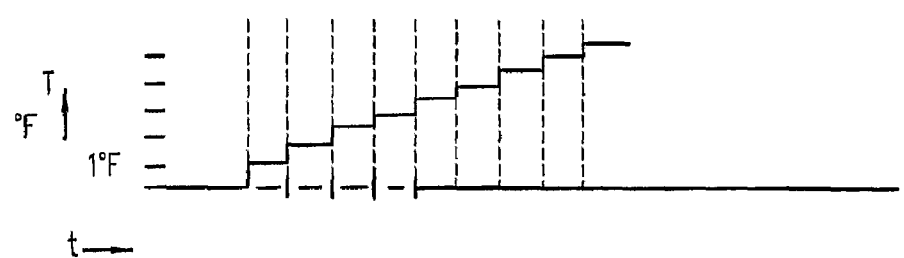

In contrast, if there is little or no water in the tank, the sensing of temperature every four seconds would likely result in a change of temperature which is greater than 1° F. As shown in FIG. 4, this also may result in a steady rise with generally no interval having an increase of less than 0.5° F. The increase in temperature or at least the steady rise in temperature is due to the absence of water in the tank. The absence of water results in the failure to absorb the energy from the heat pulse. As such, the temperature sensor senses increasing temperature. If the temperature never levels out after a predetermined period of time, for example, 80 seconds, the system is programmed to assume that there is no water or insufficient water in the reservoir. Basically, the system monitors for three consecutive intervals which have temperature increases which are less than or equal to 0.5° F. If this condition is not met, the system is programmed to assume that there is no or insufficient water in the tank.

In other words, once the heating element 54 is turned on for five seconds and energy is introduced into the water 40 and the reservoir 22, the sensing of the temperature in the first 4-second interval would likely indicate a temperature increase of greater than 1° F. If this situation occurs the counter 100 is decremented. After the next 4-second period, if the detector senses a small change, less than 1° F., the counter can be incremented. This will result in a zero sum sensing. The system will accommodate various changes in the system and still maintain the desired system protection parameters. If after a predetermined period of time, for example, 80 seconds, the counter 100 has not been incremented a desired number of increments to satisfy testing parameters, for example, three increments, the system will indicate that there is an error and the tank is low on water or dry.

It should be noted that various parameters and levels can be set for various operating conditions. For example, the intervals over which temperature is detected may be increased or decreased in length. Similarly, the acceptable period of time over which the temperature is sensed may be greater than or less than 80 seconds, depending on the associated need to quickly operate the system or the acceptable ability to wait a period of time.

Regardless of the parameters the system as described herein, the methods associated with the system detect a low water condition in the tank and recognize the rate of increase in the tank temperature after pulsing the heating element 54. It should be noted that this system may be implemented without a vacation switch such that upon activation of a heating cycle in ordinary use the system may pulse and cautiously approach the heating function. This will prevent reheating the tank in the situation of a leak, such as due to failure of a seal, which can result in water draining from the tank. This system can be implemented with one, two or more temperature sensors of any variety of configurations which is acceptable for the desired operating parameters.

Additionally, when a dry tank is detected a flag is set in the novram (non-volitile) RAM in the controller) so that when the unit is powered up the next time a routine is executed to prevent heating an empty or low water tank. The power up routine will require conditions to be met before significant heating of the tank will occur. In the present embodiment 2 conditions will need to be met before heating, including: 1. dispensing of a predetermined acceptable volume of water to the tank, for example 16 ounces of water or more; and 2. the tank temperature must be below 100° F. Damage to the tank, heater and system may be prevented by satisfying these two conditions. For example it is not desirable o run the detection and analysis testing as described above on a system that is too hot because the net result of the test heating could cause cumulative heating of sufficient temperature to cause damage. Dispensing or injecting the predetermined volume of water into the tank should absorb at least some of the heat in the too provide a cooling effect on the system.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There is a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

What is claimed is:

1. A system for preventing a heating chamber of the system from overheating comprising:
    a controller;
    a water delivery system including an unheated reservoir for receiving water, a level sensor associated with the reservoir and coupled to the controller,
    a heating chamber communicating with the reservoir;
    a heating element coupled to the controller for controllably heating water in the heating chamber;
    a controllable pump coupled to the controller and communicating with the water delivery system for transferring water from the reservoir to a heating chamber;
    a water dispensing system for dispensing heater water from the heating chamber; and
    wherein the level sensor is coupled to a flow meter to detect the flow of water from the pump to the heating chamber, the flow meter being coupled to and in communication with the controller, the controller terminating operation of the pump after a predetermined number of flow counts.

2. The system of claim 1, wherein the water delivery system comprises a pressurized inlet water line and a valve, the valve being connected to and communicating with the controller.

3. The system of claim 2, further comprising a switch coupled to and in communication with the controller for controllably operating the dispensing of water through the delivery system.

4. The system of claim 1, wherein the water dispensing system further comprises a dispense line and a spray head, wherein the dispense line dispenses water through the spray head and into a brewing holder.

5. The system of claim 2, wherein the controller is connected to and in communication with the heating element, the pump and the heating chamber.

6. The system of claim 1, further comprising a thermostat for detecting the temperature in the heating chamber, the thermostat being coupled to and in communication with the controller.

7. The system of claim 1, further comprising a low duty switch coup ed to and in communication with the controller.

8. The system of claim 1, further comprising an on-off switch.

9. The system of claim 1, further comprising a second temperature sensor, coupled to and in communication with the controller, the second temperature sensor for detecting the external temperature of the heating chamber.

10. The system of claim 1, further comprising a thermostat for detecting the temperature in the reservoir, the thermostat being coupled to and in communication with the controller.

11. The system of claim 1, further comprising a low duty switch coupled to and in communication with the controller.

12. The system of claim 1, further comprising an on-off switch.

13. The system of claim 1, further comprising a second temperature sensor, coupled to and in communication with the controller, the second temperature sensor for detecting the external temperature of the reservoir.

14. The system of claim 1, wherein the level sensor operates on a time dependent basis.

15. The system of claim 1, wherein the water dispensing system further comprises a dispense line and a spray head, wherein the dispense line dispenses water through the spray head and into a brewing holder.

* * * * *